United States Patent
Matsuo et al.

(10) Patent No.: US 10,399,153 B2
(45) Date of Patent: Sep. 3, 2019

(54) ROTARY CUTTING TOOL INCLUDING POLYCRYSTALLINE DIAMOND MATERIAL

(71) Applicant: MITSUBISHI MATERIALS CORPORATION, Tokyo (JP)

(72) Inventors: Toshihiko Matsuo, Naka-gun (JP); Wardoyo Akhmadi Eko, Naka-gun (JP); Chihiro Sakurazawa, Tsukuba (JP); Tadakazu Ohashi, Mito (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 111 days.

(21) Appl. No.: 15/129,300

(22) PCT Filed: Mar. 27, 2015

(86) PCT No.: PCT/JP2015/059633
§ 371 (c)(1),
(2) Date: Sep. 26, 2016

(87) PCT Pub. No.: WO2015/147264
PCT Pub. Date: Oct. 1, 2015

(65) Prior Publication Data
US 2017/0106454 A1     Apr. 20, 2017

(30) Foreign Application Priority Data

Mar. 28, 2014 (JP) .................................. 2014-070336
Mar. 20, 2015 (JP) .................................. 2015-058616

(51) Int. Cl.
*B23B 51/00* (2006.01)
*B23B 51/02* (2006.01)
(Continued)

(52) U.S. Cl.
CPC .............. *B23B 51/02* (2013.01); *B23B 51/06* (2013.01); *B23C 5/10* (2013.01);
(Continued)

(58) Field of Classification Search
CPC ........ B23B 2226/315; B23B 2226/275; B23B 2228/105; B23B 2251/44; B23B 51/06;
(Continued)

(56) References Cited

U.S. PATENT DOCUMENTS 4,671,710 A      6/1987  Araki
5,020,394 A  *   6/1991  Nakamura .............. B23B 51/00
                                                        407/118
(Continued)

FOREIGN PATENT DOCUMENTS

CN          1053903 A       8/1991
CN          2083087 U       8/1991
(Continued)

OTHER PUBLICATIONS

Office Action dated May 5, 2017 for the corresponding Chinese Patent Application No. 201580015580.4.
(Continued)

*Primary Examiner* — Willmon Fridie, Jr.
(74) *Attorney, Agent, or Firm* — Leason Ellis LLP (57) ABSTRACT

A rotary cutting tool including a polycrystalline diamond material of the invention includes: a tool body rotated about an axis with a carbide substrate made of cemented carbide and a flute provided at a tip portion thereof; a PCD layer sintered integrally with the carbide substrate, provided on an inside face of the flute facing in a rotation direction; and a cutting edge provided on the PCD layer to have the inside face as a rake face, in which a margin portion continuous with a rear side of the flute in the rotation direction is formed on an outer periphery of the tip portion, the cutting edge is formed at a ridge portion of the rake face, and a thickness of the PCD layer is 1/3 to 1 times a width of the margin portion.

10 Claims, 6 Drawing Sheets

(51) Int. Cl.
*B23C 5/10* (2006.01)
*B23B 51/06* (2006.01)

(52) U.S. Cl.
CPC ... *B23B 2226/275* (2013.01); *B23B 2226/315* (2013.01); *B23B 2228/105* (2013.01); *B23B 2251/44* (2013.01); *B23C 2210/44* (2013.01); *B23C 2226/27* (2013.01); *B23C 2226/315* (2013.01); *B23C 2228/10* (2013.01)

(58) Field of Classification Search
CPC ....... B23B 51/02; B23C 5/10; B23C 2210/44; B23C 2226/27; B23C 2226/315; B23C 2228/10
See application file for complete search history.

(56) References Cited

U.S. PATENT DOCUMENTS

| | | | | |
|---|---|---|---|---|
| 5,070,748 | A | * | 12/1991 | Packer ................ B23C 5/006 407/118 |
| 5,272,940 | A | * | 12/1993 | Diskin ................ B23C 5/1081 407/118 |
| 5,273,379 | A | | 12/1993 | Nishimura |
| 5,297,456 | A | | 3/1994 | Nishimura |
| 5,685,671 | A | * | 11/1997 | Packer ................ B23C 5/1018 407/118 |
| 5,685,674 | A | * | 11/1997 | Taquist ................ B23B 51/02 408/1 R |
| 8,176,825 | B1 | * | 5/2012 | Isaacson ............... B23C 5/1081 175/435 |
| 9,073,132 | B2 | * | 7/2015 | Cha ........................ B23C 5/18 |
| 9,539,652 | B2 | * | 1/2017 | Sampath ................ B23B 51/02 |
| 2003/0175085 | A1 | * | 9/2003 | Prokop ................ B23B 51/00 408/59 |
| 2005/0031421 | A1 | * | 2/2005 | Inglis ................ B23C 5/1081 407/53 |
| 2010/0098505 | A1 | | 4/2010 | Garrick et al. |
| 2011/0176879 | A1 | | 7/2011 | Jonker et al. |
| 2013/0121777 | A1 | * | 5/2013 | Gey ................. B23B 51/048 407/118 |
| 2013/0223941 | A1 | * | 8/2013 | Bozkurt ................ B23B 27/18 407/11 |
| 2016/0023328 | A1 | * | 1/2016 | Flaschberger .......... B24B 53/07 51/309 |

FOREIGN PATENT DOCUMENTS

| | | |
|---|---|---|
| CN | 1396030 A | 2/2003 |
| CN | 2579573 Y | 10/2003 |
| CN | 102240827 A | 11/2011 |
| GB | 2131726 A | 6/1984 |
| JP | 59-081010 A | 5/1984 |
| JP | 02-063912-U A | 5/1990 |
| JP | 03-277412 A | 12/1991 |
| JP | 05-261613 A | 10/1993 |
| JP | 2002-178211 A | 6/2002 |
| JP | 2006-088242 A | 4/2006 |
| JP | 2008-264979 A | 11/2008 |
| JP | 2011-046555 A | 3/2011 |

OTHER PUBLICATIONS

Office Action dated Nov. 23, 2018 for the corresponding Chinese Patent Application No. 201580015580.4.
Office Action dated Dec. 20, 2017 for the corresponding Chinese Patent Application No. 201580015580.4.
European Search Report dated Oct. 6, 2017 for the corresponding European Patent Application No. 15770075.8.
Miess et al., "Fracture toughness and thermal resistance of polycrystalline diamond compacts", *Materials Science and Engineering:A*, 1996, pp. 270-276, vol. 209.1.
International Search Report dated May 26, 2015 for the corresponding PCT Application No. PCT/JP2015/059633.
Office Action dated Jan. 22, 2019 for the corresponding Japanese Application No. 2015-058616.
Office Action dated Jun. 18, 2019 for the corresponding Japanese Application No. 2015-058616 (an English translation attached hereto).

* cited by examiner

ROTARY CUTTING TOOL INCLUDING POLYCRYSTALLINE DIAMOND MATERIAL

CROSS-REFERENCE TO RELATED PATENT APPLICATIONS

This application is a U.S. National Phase Application under 35 U.S.C. § 371 of International Patent Application No. PCT/JP2015/059633, filed Mar. 27, 2015, and claims the benefit of Japanese Patent Applications No. 2014-070336, filed Mar. 28, 2014 and No. 2015-058616, filed Mar. 20, 2015, all of which are incorporated by reference herein in their entireties. The International Application was published in Japanese on Oct. 1, 2015 as International Publication No. WO/2015/147264 under PCT Article 21(2).

FIELD OF THE INVENTION

The present invention relates to a rotary cutting tool including a PCD material, such as a drill or an end mill, of which a cutting edge is formed on a PCD layer made of a polycrystalline diamond (hereinafter, referred to as PCD) material.

BACKGROUND OF THE INVENTION

For example, even if a drill made of hard cemented carbide is used in a case in which drilling is performed on a work material made of CFRP (carbon fiber-reinforced plastic) or a work material that is made of a composite material in which a plate made of titanium, aluminum, or an alloy of titanium and aluminum is laminated on CFRP, the wear of the drill is generated and the drill reaches the end of their tool life early. Accordingly, for example, U.S. Patent Application Publication No. 2011/0176879 proposes that the pre-compacted body of PCD be held in a carrier body formed of cemented carbide and is sintered at ultra-high pressure and ultra-high temperature to form a superhard body including a PCD layer, and the superhard body is mounted on the tip of a tool body and flutes are formed to manufacture a rotary machine tool, such as a drill or an end mill, including cutting edges on the PCD layer.

Technical Problem

Incidentally, in the rotary cutting tool of which the cutting edges are formed on the PCD layer, the PCD material has high wear resistance but low fracturing resistance due to low toughness. Accordingly, if the PCD layer of an edge tip of the cutting edge is too thick, fracture easily occurs. For this reason, the tool life is adversely shortened. On the other hand, if the PCD layer of the edge tip is too thin, the wear reaches a carbide substrate (the carrier body) made of cemented carbide early during cutting. Accordingly, the tool life is also shortened.

Further, in a case in which the thickness of the PCD layer is not uniform, stress concentration occurs at a boundary between the carbide substrate made of cemented carbide and the PCD layer at a portion where the PCD layer is thin. When a cutting force generated during cutting is applied to the boundary point on which stress is concentrated in this way, cracks are generated from the portion where the PCD layer is thin. Thus, there is also a concern that fracture of the PCD layer may be caused.

The present invention has been made in consideration of the above-mentioned circumstances, and an object of the present invention is to provide a rotary cutting tool including a PCD material, such as a drill or an end mill, of which a cutting edge is formed on a PCD layer and in which the progress of wear can be controlled, in which the fracturing resistance of a PCD layer can be sufficiently ensured, and which can perform stable cutting on a work material made of CFRP or a composite material thereof for a long time.

SUMMARY OF THE INVENTION

Solution to Problem

Here, the inventors of the present invention performed cutting tests on a work material, which was made of CFRP or a composite material thereof, under various conditions by a drill or an end mill of which cutting edges were formed on the PCD layer. As a result, the inventors have obtained knowledge that the fracturing resistance of the PCD layer is affected by a ratio of the thickness of the PCD layer to the width of a margin portion formed on the outer periphery of a tip portion of a tool body to be continuous with the rear side of the flutes in the rotation direction. The reason for this is considered to be that a cutting force applied to the PCD layer can be relaxed since impact energy applied when the cutting edges formed on the PCD layer come into contact with the work material during cutting, is received by the carbide substrate made of cemented carbide and having toughness higher than that of the PCD material.

Accordingly, the present invention has been made on the basis of the above-mentioned knowledge. According to a first invention, a rotary cutting tool including a PCD material is provided. The rotary cutting tool includes: a tool body configured to be rotated about an axis with a carbide substrate made of cemented carbide and a flute provided at a tip portion of the tool body; a PCD layer made of a PCD material sintered integrally with the carbide substrate and provided on an inside face of the flute which faces in a rotation direction of the tool body; and a cutting edge provided on the PCD layer to have a rake face as the inside face. A margin portion continuous with a rear side of the flute in the rotation direction is formed on an outer periphery of the tip portion of the tool body, the cutting edge is formed at a ridge portion of the rake face at a tip side of the tool body, and a thickness of the PCD layer is set in a range of ⅓ to 1 times a width of the margin portion when seen from the tip side of the tool body in a direction of the axis.

Further, according to a second invention, a rotary cutting tool including a PCD material is provided. The rotary cutting tool includes: a tool body configured to be rotated about an axis with a carbide substrate made of cemented carbide and a flute provided at a tip portion of the tool body; a PCD layer made of a PCD material sintered integrally with the carbide substrate and provided on an inside face of the flute which faces in a rotation direction of the tool body; and a cutting edge provided on the PCD layer to have a rake face as the inside face. A margin portion continuous with a rear side of the flute in the rotation direction is formed on an outer periphery of the tip portion of the tool body, the cutting edge is formed at a ridge portion of the rake face at an outer periphery of the tool body, and a thickness of the PCD layer is set in a range of ⅓ to 1 times a width of the margin portion when seen from an outer peripheral side of the tool body in a radial direction with respect to the axis.

The first invention relates to a drill having a cutting edge formed at a ridge portion of a rake face as the inside face of a flute facing in a rotation direction at the tip side of the tool body, or an end cutting edge of an end mill. The second invention relates to a peripheral cutting edge and the like of an end mill of which a cutting edge is formed at a ridge portion of the rake face at an outer periphery of the tool body. According to the present invention, the thickness of the PCD layer is set in the range of ⅓ to 1 times the width of the margin portion, and thus the substantially constant, necessary and sufficient thickness of the PCD layer can be ensured. Accordingly, it is possible to suppress fracturing of the PCD layer while preventing wear from reaching the carbide substrate early.

That is, in the first and second inventions, when the thickness of the PCD layer is smaller than ⅓ times the width of the margin portion, the PCD layer is too thin and thus wear reaches the carbide substrate made of cemented carbide early and wearing of the tool body is immediately accelerated. As a result, the tool life is shortened. On the other hand, when the thickness of the PCD layer is larger than 1 time the width of the margin portion, that is, exceeds the width of the margin portion, it is not possible to relax a cutting force which is caused by impact energy generated when the rotary cutting tool comes into contact with the work material during cutting. As a result, fracture occurs on the PCD layer.

As long as the thickness of the PCD layer is in the range of ⅓ to 1 times the width of the margin portion as described above, the thickness of the PCD layer may be increased or reduced along the cutting edge. However, in order to reliably prevent fracture caused by the above-mentioned stress concentration, it is desirable that a difference between the maximum value and the minimum value of the thickness of the polycrystalline diamond layer be set in a range equal to or smaller than ⅖ times the width of the margin portion.

Further, the PCD layer may contain 75 to 95 vol % of diamond, and it is preferable that a diamond grain size of the PCD layer be in a range of 0.5 to 60 μm. Furthermore, a Knoop hardness of the polycrystalline diamond layer may be in a range of 35 to 44 GPa.

Advantageous Effects of Invention

According to the present invention, as described above, it is possible to ensure sufficient fracturing resistance of the PCD layer on which the cutting edge is formed while suppressing wear reaching the carbide substrate made of cemented carbide early, and to perform stable cutting on a work material made of, particularly, CFRP or a composite material thereof, for a long period.

DETAILED DESCRIPTION OF THE INVENTION

Figure 1:
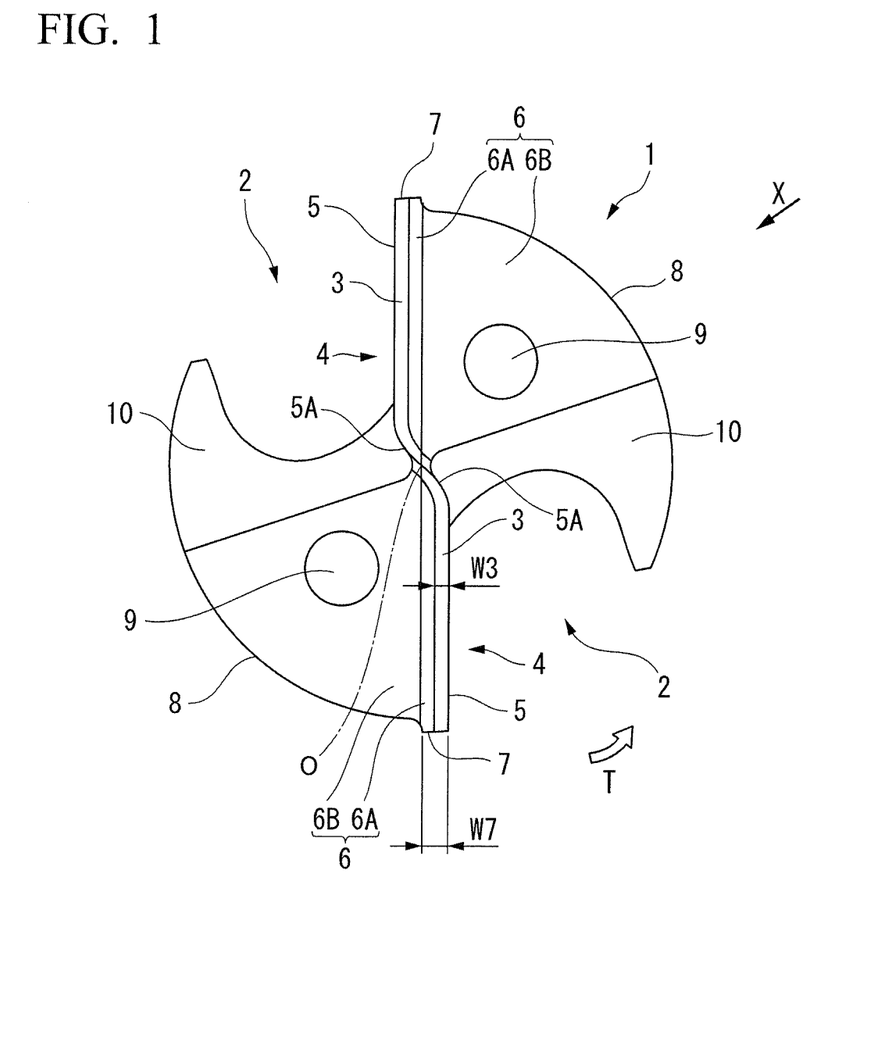
FIG. 1 is a front view of a drill as a first embodiment of the present invention that is seen from a tip side in a direction of an axis.
Figure 2:
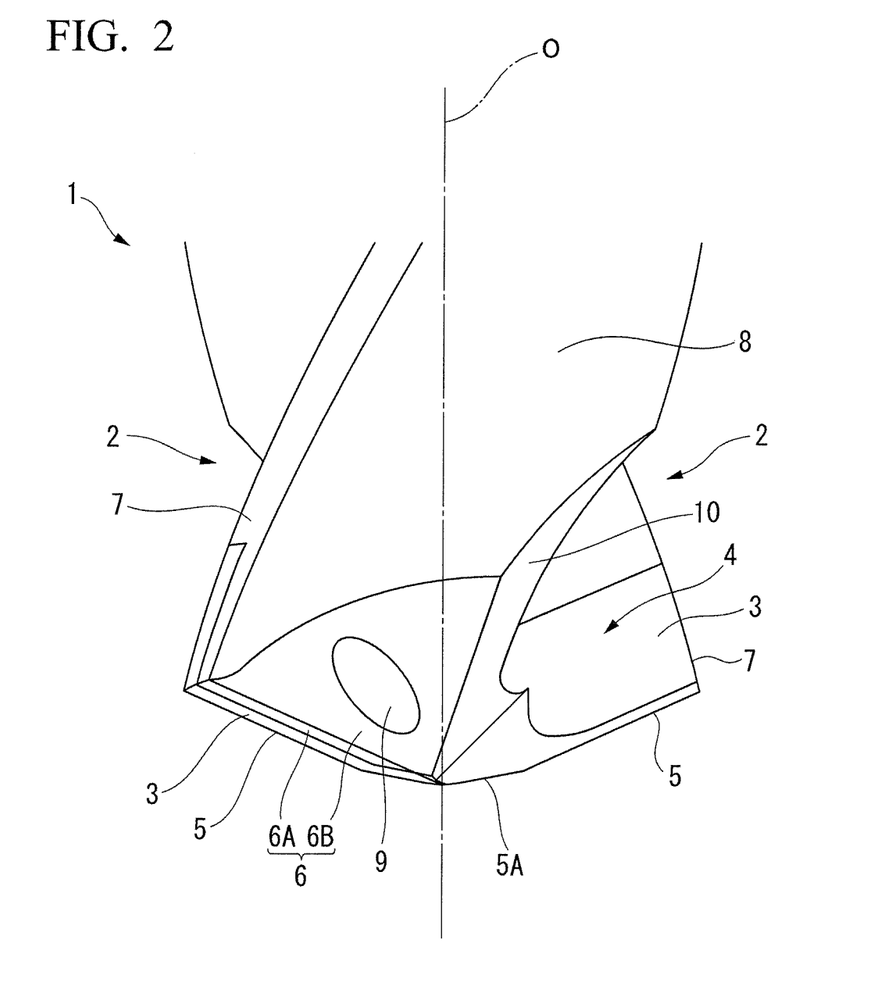
FIG. 2 is a side view that is seen in the direction of an arrow X of FIG. 1.

FIGS. 1 and 2 show a drill as a first embodiment of a rotary cutting tool including a PCD material of the present invention. In the present embodiment, a tool body (drill main body) 1 has a substantially columnar outer shape around an axis O. A posterior end portion (an upper portion in FIG. 2) (not shown) of the tool body forms a columnar shank portion, and a tip portion (a lower portion in FIG. 2) of the tool body forms a cutting edge portion. A drill as the rotary cutting tool including a PCD material of the present embodiment is fed toward the tip side in the direction of the axis O while being rotated about the axis O in a drill rotation direction T in a state where the shank portion is held by a spindle of a machine tool. Accordingly, the rotary cutting tool including a PCD material performs drilling on a work material, which is made of, for example, CFRP or a composite material thereof, by the cutting edge portion.

Flutes 2, which extend toward the posterior end from the tip of the tool body 1, are formed on the outer periphery of the cutting edge portion. In the present embodiment, two flutes 2 are formed to be symmetrical with respect to the axis O and to twist about the axis O rearward in the drill rotation direction T toward the posterior end of the tool body 1. Moreover, PCD layers 3 made of a PCD material are provided at tip portions of the inside faces, which face in the rotation direction T, of these flutes 2. On the other hand, a portion of the tool body 1 other than the PCD layers 3 is formed of a carbide substrate made of cemented carbide, and the PCD layers 3 are sintered integrally with the carbide substrate.

Cutting edges 5 which have rake faces 4 constituted by the inside faces of the two flutes 2 facing in the rotation direction T are formed on the PCD layers 3 at ridge portions of the rake faces 4 at the tip side of the tool body 1. That is, the rotary cutting tool including a PCD material of the present embodiment is a double-edge twist drill. Further, portions of the tip surface of the tool body 1, the portions of which are continuous with the rear side of the cutting edges 5 in the rotation direction T, form flanks 6.

In addition, margin portions 7, which twist in the same manner as the flutes 2 so as to be continuous with the rear side of the flutes 2 in the rotation direction T, are formed on the outer periphery of the cutting edge portion to have a small width W7 that is constant in a circumferential direction. The margin portions 7 are formed so that the outer peripheral surfaces of the margin portions 7 are positioned on one cylindrical surface around the axis O. Further, the outer peripheral surface of the cutting edge portion which is continuous with the rear side of the margin portions 7 in the rotation direction T forms outer peripheral flank faces (second relieving faces) 8 that are positioned on a cylindrical surface having an outer diameter slightly smaller than that of the cylindrical surface on which the margin portions 7 are positioned. In other words, the margin portion 7 is a region that does not have a clearance angle on a flank face (a face including the outer peripheral flank face 8) formed to be continuous with the rear side of the cutting edge 5 in the rotation direction T.

In the flank 6, a portion which is continuous with the rear side of each cutting edge 5 in the rotation direction T forms a first flank 6A, and a portion which is further continuous with the rear side of the first flank 6A in the rotation direction T forms a second flank 6B of which the clearance angle is larger than that of the first flank 6A. Coolant holes 9 formed in the tool body 1 are opened to the second flanks 6B.

In the present embodiment, when seen from the tip side in the direction of the axis O as shown in FIG. 1, each cutting edge 5 linearly extends toward the inner peripheral side of the tool body 1 from the outer peripheral end of the cutting edge 5. Further, a thinning face 10 is formed in the vicinity of the axis O on the inner peripheral side of each cutting edge 5 on the rear side of the second flank 6B in the rotation direction T on the tip surface of the tool body 1, so that a thinning edge 5A is formed in the shape of a convex curve so as to be connected to the linearly extending portion of the cutting edge 5 and extend toward the axis O.

The first flank 6A is formed so that the width of the first flank 6A, which is seen from the tip side in the direction of the axis O, is substantially equal to the width W7 of the margin portion 7 at the linearly extending portion of the cutting edge 5. In addition, each cutting edge 5 has a point angle so as to extend to the outer peripheral end of the cutting edge 5 from the vicinity of the axis O and toward the rear side (posterior end portion side) of the tool body 1.

In the present embodiment, when seen from the tip side of the tool body 1 in the direction of the axis O, the thickness (width) W3 of each of the PCD layers 3 is set in the range of ⅓ to 1 times the width W7 of the margin portion 7. Further, in the present embodiment, as shown in FIG. 1, the thickness W3 of the PCD layer 3 exposed to the flank 6 (the first flank 6A) is set to about ½ times the width W7 of the margin portion 7 and the PCD layer 3 extends along the cutting edge 5 with the constant thickness W3. Here, the thickness (width) W3 of the PCD layer 3 is a thickness along the ridge of the cutting edge 5. Further, the width W7 of the margin portion 7 is the width of the outermost peripheral portion of the margin portion 7.

Furthermore, since the PCD layer 3 is provided on the tip side of the rake face 4, the PCD layer 3 is also exposed to the front side in the rotation direction T on the outer peripheral surface of the margin portion 7 at the tip side thereof. The thickness of the PCD layer 3 exposed to the margin portion 7 also is set in the range of ⅓ to 1 times the width W7 of the margin portion 7 as in the case of the thickness W3, and in the present embodiment, it is set to about ½ times the width W7. The surfaces of the PCD layer 3 exposed in this way are formed to be smoothly continuous with the outer peripheral surface of the margin portion 7, the first flank 6A, and the inside face at the tip of the flute 2 which is the rake face 4 and faces in the rotation direction T, respectively.

The rotary cutting tool including a PCD material (drill) can be produced in the method similar to the tool described in, for example, U.S. Patent Application Publication No. 2011/0176879. That is, slits are formed at portions where the PCD layers 3 are to be disposed in a base metal formed of a preliminarily sintered cemented carbide substrate, and are filled with diamond powder or mixed powder of diamond, cobalt as a binder, and the like; the base metal is sintered at ultra-high pressure and ultra-high temperature to produce a disc-shaped composite sintered material (blank) with a PCD material; the composite sintered material is coaxially brazed to the tip of a columnar base metal formed of cemented carbide; and the cutting edges 5 are sharpened; and then the flanks 6, the margin portions 7, the outer peripheral flank faces 8, and the flutes 2 including the rake faces 4 are formed by grinding so that the PCD layer 3 is exposed by the predetermined thickness W3. As a result, the rotary cutting tool including a PCD material (drill) can be produced.

In the rotary cutting tool including a PCD material that is produced in this way and has the above-mentioned structure, the thickness W3 of the PCD layer 3 is set in the range of ⅓ to 1 times the width W7 of the margin portion 7 and is substantially constant and the necessary and sufficient thickness W3 of the PCD layer 3 can be ensured. For this reason, even though drilling is performed on a work material made of CFRP or a work material made of a composite material in which a plate made of titanium, aluminum, or an alloy of titanium and aluminum is laminated on CFRP, it is possible to prevent wear caused by the cutting of the work material from reaching cemented carbide that is the carbide substrate early and to suppress the fracturing of the PCD layer 3 that is caused by impact energy generated due to the contact between the work material and the rotary cutting tool.

Here, when the thickness W3 of the PCD layer 3 is smaller than ⅓ times the width W7 of the margin portion 7, wear reaches the carbide substrate of the tool body 1 made of cemented carbide early as shown in examples described below, so that the wear of the carbide substrate is immediately accelerated. As a result, the shortening of the tool life is caused. On the other hand, when the thickness W3 of the PCD layer 3 is larger than the width W7 of the margin portion 7, a cutting force caused by impact energy generated by contact of the rotary cutting tool with the work material during cutting, cannot be absorbed and relaxed by the cemented carbide substrate with high toughness. For this reason, since the cutting force is directly applied to the PCD layer 3, fracture occurs.

Particularly, in the present embodiment, the thickness W3 of the PCD layer 3 is set to the constant thickness W3 in the range of ⅓ to 1 times the width W7 of the margin portion 7, that is, the PCD layer 3 does not include a portion of which the thickness W3 is changed to a small thickness from a large thickness. Accordingly, since stress caused by the cutting force is not concentrated on such a portion, it is possible to prevent cracks from being generated in the PCD layer 3 due to stress concentration and thereby to prevent fracture.

Moreover, in the present embodiment, the constant thickness W3 of the PCD layer 3 is set to ½ times the width W7 of the margin portion 7. Accordingly, a portion with a thickness set to ½ times the width W7 in the carbide substrate made of cemented carbide, remains at the margin portion 7 on the rear side of the PCD layer 3 in the rotation direction T. For this reason, a cutting force applied to the PCD layer 3, particularly, the periphery of the outer peripheral end of the cutting edge 5, can also be reliably relaxed by this portion of the carbide substrate. Accordingly, the fracturing of the PCD layer 3 can be suppressed over the entire length of the cutting edge 5. The thickness W3 of the PCD layer 3 may not be exactly constant. However, in order to reliably obtain this effect, it is desirable that a difference between the maximum value and the minimum value of the thickness W3 of the PCD layer 3 be set in the range equal to or smaller than ⅖ times the width W7 of the margin portion 7.

Figure 3:
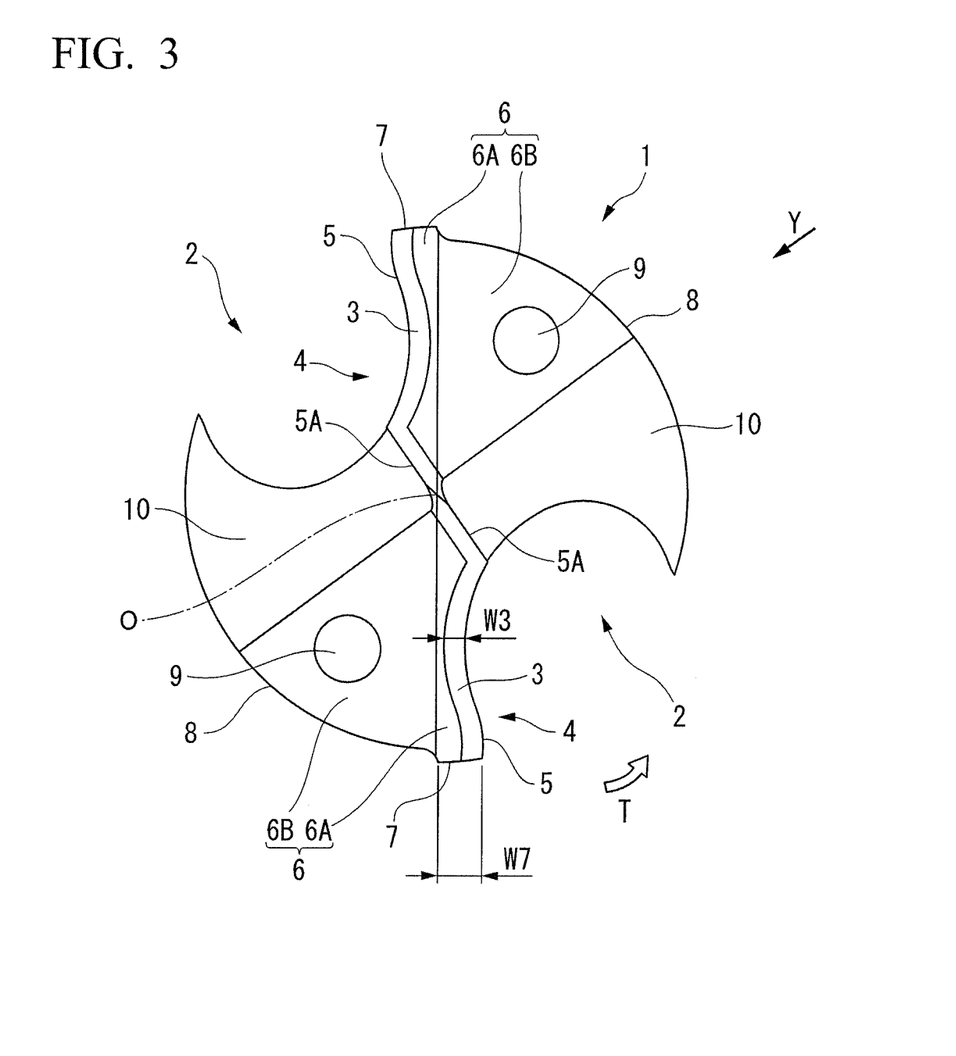
FIG. 3 is a front view of a drill as a second embodiment of the present invention that is seen from a tip side in a direction of an axis.
Figure 4:
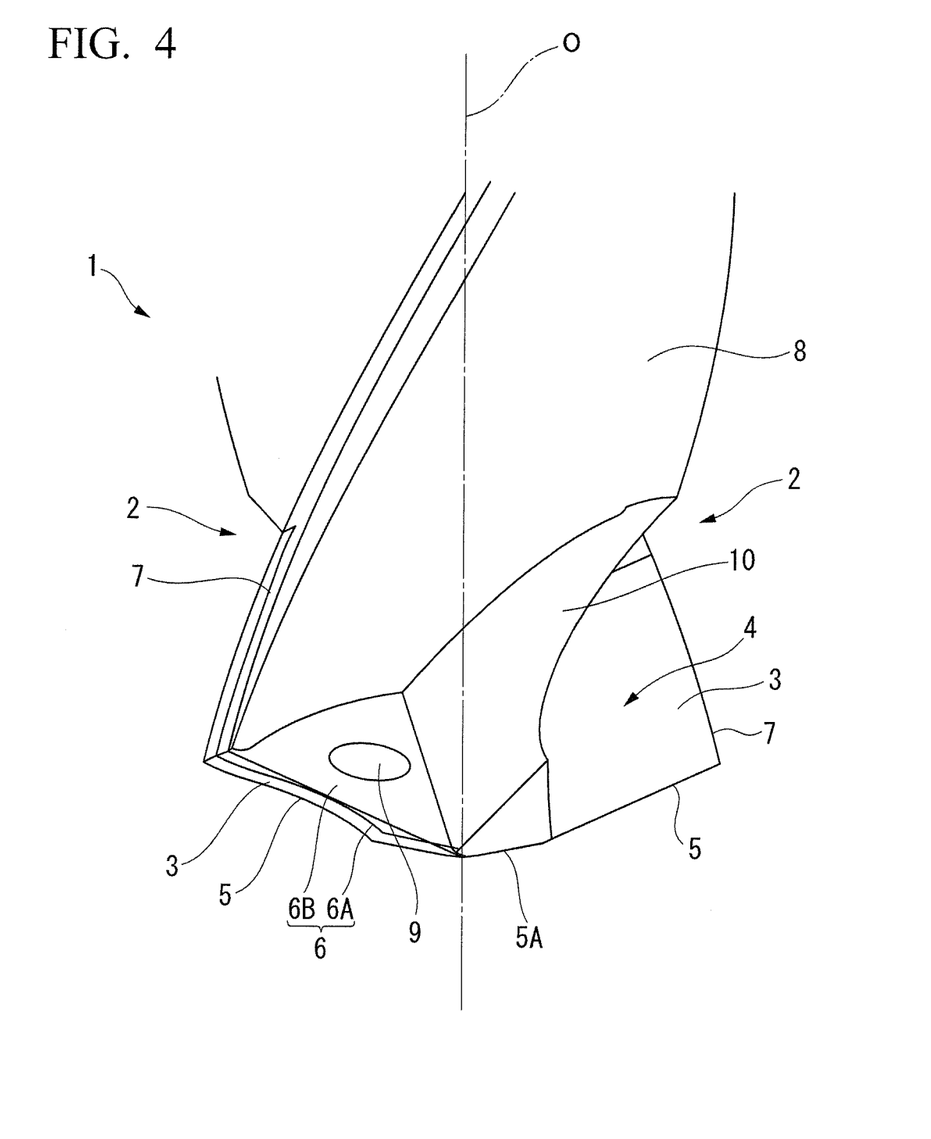
FIG. 4 is a side view that is seen in the direction of an arrow Y of FIG. 3.

Next, FIGS. 3 and 4 show a second embodiment of the rotary cutting tool including a PCD material of the present invention, and the second embodiment is also a double-edge twist drill as in the case of the first embodiment. Portions common to the first embodiment shown in FIGS. 1 and 2 are denoted by the same reference numerals and the description thereof will be simplified. That is, in the first embodiment, when seen from the tip side in the direction of the axis O, each cutting edge 5 directs to the axis O to be continuous with the convex curve-shaped thinning edge 5A after linearly extending toward the inner peripheral side from the outer peripheral end of the tool body 1. In the second embodiment, each cutting edge 5 is formed in the shape of a concave and convex curve between the outer peripheral end thereof and the thinning edge 5A.

In more detail, in a front view seen from the tip side in the direction of the axis O, as shown in FIG. 3, each cutting edge 5 of the second embodiment is formed in the shape of a concave and convex curve. That is, in order from the vicinity of the axis O on the inner peripheral side of the tool body 1 toward the outer peripheral side thereof, a thinning edge 5A substantially linearly extends, and the cutting edge 5 is formed in a convex shape that is convex in the drill rotation direction T, is formed in the shape of a concave curve that is slightly concave toward the rear side in the drill rotation direction T from the portion formed in the convex shape, and reaches the outer peripheral end of the cutting edge 5 to draw a convex curve that becomes convex in the drill rotation direction T again. Accordingly, the rake face 4 where the cutting edge 5 is formed at a ridge portion crossing the flank 6 also has the shape of a concave and convex curved surface which is similarly concave and convex in the drill rotation direction T, at least in the vicinity of the cutting edge 5.

Even in the second embodiment, the thickness W3 of the PCD layer 3 disposed on the rake face 4 having the shape of a concave and convex curved surface, is set in the range of ⅓ to 1 times the width W7 of the margin portion 7, when seen from the tip side of the tool body 1 in the direction of the axis O. Further, the PCD layer 3 extends along the cutting edge 5 with the constant thickness W3 as shown in FIG. 3. Furthermore, when seen from the tip side in the direction of the axis O, the thickness W3 of the PCD layer 3 is also set to about ½ times the width W7 of the margin portion 7.

In the second embodiment, the thickness W3 of the PCD layer 3 is set in the range of ⅓ to 1 times the width W7 of the margin portion 7 as in the first embodiment. Accordingly, it is possible to ensure sufficient fracturing resistance of the PCD layer 3 on which the cutting edge 5 is formed while suppressing wear reaching the carbide substrate made of cemented carbide early, and to perform stable drilling for a long period. Moreover, particularly, since the thickness W3 of the PCD layer 3 is constant, stress concentration can be avoided even though the cutting edge 5 and the rake face 4 are formed in the shape of a concave and convex curve as described above.

Figure 5:
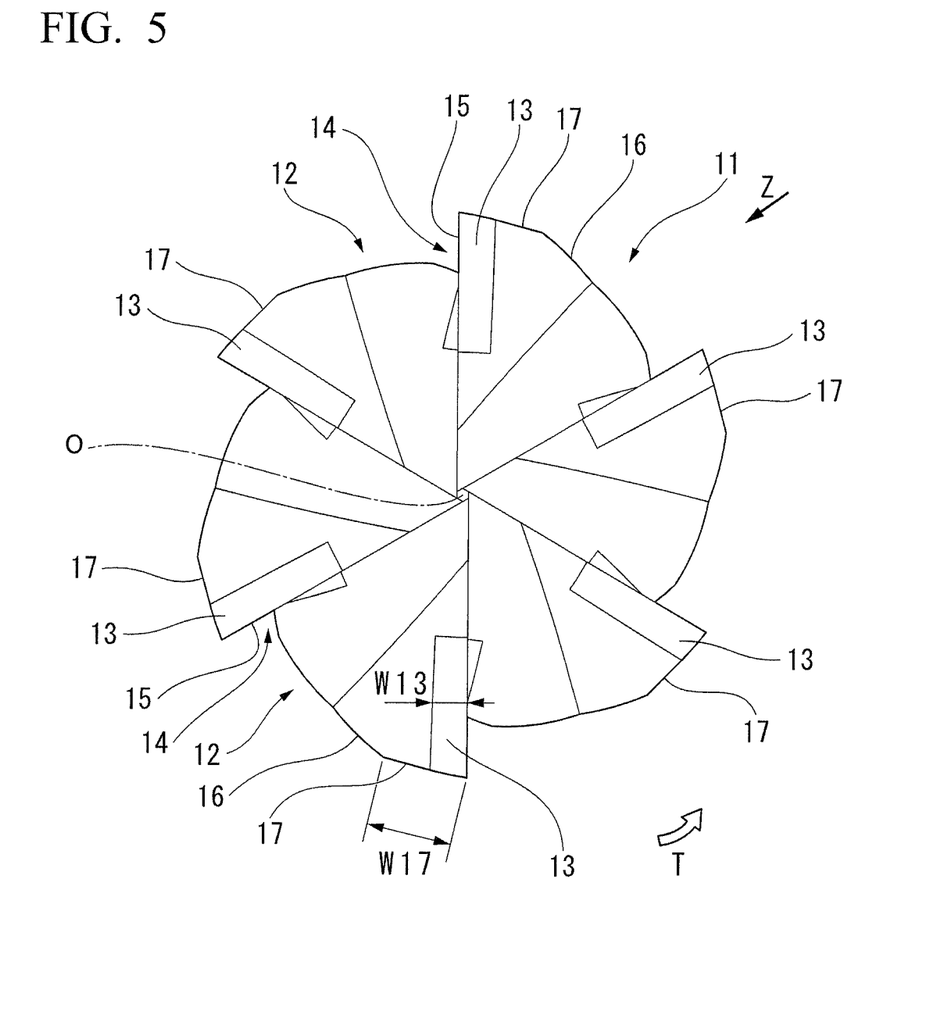
FIG. 5 is a front view of an example of an end mill to which the present invention is applied that is seen from a tip side in a direction of an axis.
Figure 6:
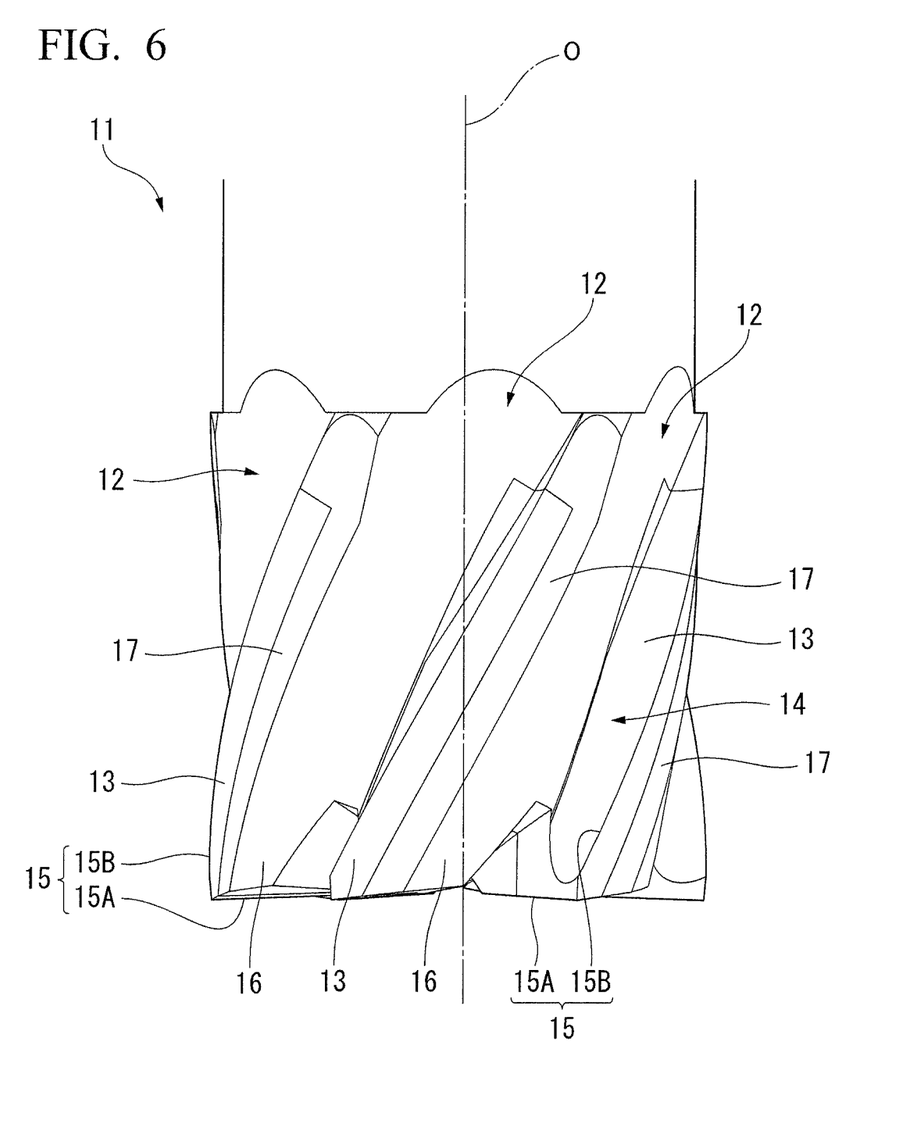
FIG. 6 is a side view that is seen in the direction of an arrow Z of FIG. 5.

In these first and second embodiments, cases in which the present invention is applied to the drill of which the cutting edges 5 are formed at only the ridge portions of the rake faces 4 at the tip side of the tool body 1 have been described. However, the rotary cutting tool including a PCD material of the present invention may be applied to a rotary cutting tool (milling tool) such as an end mill in which cutting edges 15 are formed as the end cutting edges 15A at ridge portions of rake faces 14 as inside faces of flutes 12 facing in a rotation direction T at the tip side of a tool body 11 and the peripheral cutting edges 15B is also formed at ridge portions on the outer periphery of the tool body to be continuous with the end cutting edges as shown in FIGS. 5 and 6. Here, FIGS. 5 and 6 are views showing an example of the end mill to which the present invention is applied; FIG. 5 is a front view that is seen from a tip side in a direction of the axis, and FIG. 6 is a side view that is seen in the direction of an arrow Z of FIG. 5. Further, the end mill of each of FIGS. 5 and 6 is a six-edge end mill which has a helix angle of 10° and is used for helical drilling of CFRP or the like.

Generally, this end mill performs shoulder machining or grooving on a work material by feeding the tool body 11 in a direction crossing an axis O while rotating the tool body 11 about the axis O. Accordingly, in this case, when seen from the outer peripheral side of the tool body 11 in a radial direction with respect to the axis O, the thickness W13 (which is a thickness along the ridge of the cutting edge 15 and is equal to a thickness in a circumferential direction in example shown in FIGS. 5 and 6) of a PCD layer 13 exposed to each margin portion 17 continuing to the peripheral cutting edge 15B, can be set in the range of ⅓ to 1 times the width W17 (the width of the outermost peripheral portion) of the margin portion 17. Here, a portion continuous with the rear side of each cutting edge 15 in the rotation direction T forms a flank face 16, and a region on the flank face 16 which does not have a clearance angle is a margin portion 17. Further, cutting edges may not be formed at ridge portions of the rake faces at the tip side of the tool body in an end mill that performs trimming for cutting an unwanted portion of an opening edge of a window frame-shaped work material made of CFRP or the like.

In such an end mill, unlike in the end mill of FIG. 5 in which the margin portion 17 positioned on the cylindrical surface around the axis O as in the first and second embodiments is formed on the rear side of the flute 2 in the rotation direction T so as to be continuous with the peripheral cutting edge 15B, for example, a first outer peripheral flank face having a clearance angle of 3° or less may be formed with a small width so as to be continuous with the peripheral cutting edge and a second outer peripheral flank face of which the clearance angle is larger than that of the first outer peripheral flank face may be formed on the rear side of the first outer peripheral flank face in the rotation direction T. In such a case, the thickness (the width in the circumferential direction) of the PCD layer exposed to the first outer peripheral flank face can be set in the range of ⅓ to 1 times the width of the first outer peripheral flank face in the circumferential direction, which is regarded as the width of the margin portion.

Here, it is preferable that the PCD layer according to the embodiment of the present invention contain 75 to 95 vol % of diamond and the remaining part is a metal binder (metal catalyst). When the diamond content is lower than 75 vol %, there is a concern that the PCD layer may have insufficient wear resistance dependent on work materials. When the diamond content exceeds 95 vol %, there is a concern that the PCD layer may have insufficient toughness dependent on work materials. It is more preferable that the diamond content be in the range of 80 to 92 vol %, but the diamond content is not limited thereto. Further, it is preferable that any of Co, Ni, Fe, and a combination thereof be used as the metal binder. Furthermore, in order to adjust the toughness of the PCD layer, any of carbide, nitride, carbonitride, and a combination thereof may be added to the metal binder as an additive.

It is preferable that the hardness of the PCD layer be in the range of 35 GPa to 44 GPa in Knoop hardness (Hk, a case in which a load of 500 g is used as a test force) defined by JIS Z 2251:2009 (based on ISO 4545-1:2005 and ISO 4545-4:2005). When the Knoop hardness of the PCD layer is less than 35 GPa, there is a concern that the PCD layer may have insufficient wear resistance dependent on work materials and the tool life may be shortened. When the Knoop hardness of the PCD layer exceeds 44 GPa, there is a concern that the PCD layer may have insufficient toughness against some work materials and chipping may be likely to occur. It is more preferable that the Knoop hardness of the PCD layer be in the range of 38 GPa to 42 GPa, but the Knoop hardness of the PCD layer is not limited thereto.

It is preferable that the diamond grain size of the PCD layer be in the range of 0.5 μm to 60 μm. When the diamond grain size is smaller than 0.5 μm, diamond grains are likely to abnormally grow. On the other hand, when the diamond grain size exceeds 60 μm, it is known that fracture toughness is not improved as described in, for example, Miess, D., and G. Rai. "Fracture toughness and thermal resistance of polycrystalline diamond compacts," Materials Science and Engineering: A 209.1 (1996): 270-276. In addition to that, when the diamond grain size exceeds 60 μm, it is difficult to make the edge tip of the cutting edge sharp. It is more preferable that the diamond grain size be in the range of 2 μm to 40 μm, but the diamond grain size is not limited thereto.

In order to make the diamond grain size of the PCD layer be in the above-mentioned range, it is preferable to use raw powder having an average grain size in the range of any one of 0.5 μm to 1.5 μm, 2 μm to 4 μm, 10 μm to 20 μm, and 20 μm to 40 μm as the raw powder of diamond when the PCD layer is formed. Further, two or more kinds of raw powder having any one of the above-mentioned average grain sizes may be used as described in, for example, U.S. Pat. No. 5,468,268.

The PCD layer according to the embodiment of the present invention can be formed by generally known methods described in, for example, U.S. Pat. Nos. 4,762,445, 4,713,286, 4,627,503, 5,611,251, 6,132,148, other than the same method as the above-mentioned U.S. Patent Application Publication No. 2011/0176879.

EXAMPLES

Next, the effect of the present invention will be described using examples of the present invention.

Example 1

In Example 1, double-edge twist drills, each of which includes cutting edges 5 including linear outer peripheral portions and formed at ridge portions of the rake faces 4 at a tip side of the tool body 1, were produced on the basis of the above-mentioned first embodiment. A plurality of the double-edge twist drills were produced to satisfy conditions where the thickness W3 (i.e., the thickness of the PCD layer 3 exposed to the first flank 6A) was ⅓, ½ or 1 times the width W7 (i.e., the width of the margin portion 7, in this example, was 0.5 mm). Among these double-edge twist drills, by measurements using a microscope, three double-edge twist drills for each condition were selected where the thickness W3 of the PCD layer 3 was in the range of ⅓ to 1 times the width W7 of the margin portion 7 and a difference between the maximum value and the minimum value of the thickness W3 was set in the range equal to or smaller than ⅖ times the width W7 (equal to or smaller than 0.2 mm), in which the thickness W3 was a thickness of the PCD layer 3 from the ridge of the edge tip of the cutting edge 5 in a direction perpendicular to the cutting edge 5 which was seen from the tip side of the tool body 1 in the direction of the axis O. These drills were referred to as Examples 1-1 to 1-9. In each of the drills selected as Examples 1-1 to 1-3 in which the thickness W3 of the PCD layer 3 was ⅓ times the width W7 of the margin portion 7, the minimum value of the thickness W3 of the PCD layer 3 was 0.17 mm and the maximum value thereof was 0.26 mm. Similarly, in each of the drills selected as Examples 1-4 to 1-6 in which the thickness W3 of the PCD layer 3 was ½ times the width W7 of the margin portion 7, the minimum value of the thickness W3 of the PCD layer 3 was 0.22 mm and the maximum value thereof was 0.35 mm. In each of the drills selected as Examples 1-7 to 1-9 in which the thickness W3 of the PCD layer 3 was equal to the width W7 of the margin portion 7, the minimum value of the thickness W3 of the PCD layer 3 was 0.36 mm and the maximum value thereof was 0.48 mm. Further, among the drills produced so as to have the thickness W3 of the PCD layer 3 of ½ times the width W7 of the margin portion 7, three drills were selected where the minimum value of the thickness W3 was 0.23 mm, the maximum value of the thickness W3 was 0.5 mm, and a difference between the maximum value and the minimum value was larger than ⅖ times the width W7 (larger than 0.2 mm). These drills were referred to as Examples 1-10 to 1-12.

Further, as Comparative examples to compare with these examples, three drills were also produced to satisfy each of conditions where the thickness W3 of the PCD layer 3 was ¼ or 3/2 times the width W7 of the margin portion 7 and a difference between the maximum value and the minimum value of the thickness W3 was in the range equal to or smaller than ⅖ times the width W7 (equal to or smaller than 0.2 mm), and where the thickness W3 of the PCD layer 3 was 3/2 times the width W7 of the margin portion 7 and a difference between the maximum value and the minimum value of the thickness W3 of the PCD layer 3 exceeded ⅖ times the width W7 (exceeded 0.2 mm) so that the thickness W3 of the PCD layer 3 was not uniform. These drills were referred to as Comparative examples 1-1 to 1-9. In drills of Comparative examples 1-1 to 1-3 produced so that a difference between the maximum value and the minimum value of the thickness W3 of the PCD layer 3 was equal to or smaller than ⅖ times the width W7 (equal to or smaller than 0.2 mm) and the thickness W3 of the PCD layer 3 was ¼ times the width W7 of the margin portion 7, the minimum value of the thickness W3 of the PCD layer 3 was 0.10 mm and the maximum value thereof was 0.23 mm. Similarly, in the drills of Comparative examples 1-4 to 1-6 each of which was produced so that a difference between the maximum value and the minimum value of the thickness W3 of the PCD layer 3 was equal to or smaller than ⅖ times the width W7 (equal to or smaller than 0.2 mm) and the thickness W3 of the PCD layer 3 was 3/2 times the width W7 of the margin portion 7, the minimum value of the thickness W3 of the PCD layer 3 was 0.70 mm and the maximum value thereof was 0.83 mm. Further, in the drills of Comparative examples 1-7 to 1-9 produced so that a difference between the maximum value and the minimum value of the thickness W3 of the PCD layer 3 exceeded ⅖ times the width W7 (exceeds 0.2 mm) and the thickness W3 of the PCD layer 3 was 3/2 times the width W7 of the margin portion 7, the minimum value of the thickness W3 of the PCD layer 3 was 0.15 mm and the maximum value thereof was 3.0 mm. In order to obtain the thickness of the PCD layer 3, the thicknesses of the PCD layer 3 in the direction orthogonal to the ridge of the cutting edge were measured by observing the PCD layer 3 from the tip side in the axis direction by a stereoscopic microscope, at each of six points, which equally divided a line of the PCD layer 3 along the ridge of the cutting edge from the axis O to the outer peripheral end into five pieces, in Examples 1-1 to 1-12 and Comparative examples 1-1 to 1-9. Then, the average value of the thicknesses of the PCD layer 3 at 12 points, which were measured in PCD layers 3 formed in two different cutting edges 5, was regarded as the thickness W3 of the PCD layer 3. Further, points in which thicknesses of the PCD layer 3 were the thinnest and the thickest were identified, respectively, by observing the entire PCD layer 3 by a stereoscopic microscope; and they were regarded as the minimum value and the maximum value of the thicknesses of the PCD layer, respectively. The results thereof are shown in Table 1.

Then, drilling was performed using these drills to form through-holes in a work material made of a composite material in which an alloy of titanium and aluminum was laminated on CFRP. The number of drilled holes was measured at the time of fracture occurring on the cutting edge 5 or the wear width of the cutting edge 5 reaching 0.2 mm. The diameter of each of these drills was 10 mm, the average diamond grain size of the PCD layer 3 was 10 μm, and the Co content of the PCD layer 3 was 14 vol %. Further, the work material was a material in which a Ti-6Al-4V alloy having a thickness of 10 mm was laminated on CFRP having a thickness of 5 mm. The drilling was performed by wet working in which a cutting speed was 15 m/min and a feed speed was 0.05 mm/rev with a step feed where a hole with a depth of 1 mm was formed from the CFRP side of the work material in each step. The results thereof are shown in the following Table 1.

hundred holes could be formed. In all of Examples 1-4 to 1-6 where the thickness W3 of the PCD layer 3 was ½ times the width W7 of the margin portion 7, it was found that the tool life was increased to two or more times that of Comparative examples 1-1 to 1-6.

Further, in Example 1, drilling was performed under the same conditions as described above using drills in which the minimum value of the thickness W3 was 0.21 mm, the maximum value of the thickness W3 was 0.46 mm, and a difference between the maximum value and the minimum value was larger than ⅖ times the width W7 (larger than 0.2 mm), among drills produced so that the thickness W3 of the

TABLE 1

| Thickness of PCD layer relative to width of margin portion | ¼ times | ⅓ times | ½ times | 1 time | 3/2 times | ½ times | 3/2 times |
|---|---|---|---|---|---|---|---|
| Difference between maximum value and minimum value of thickness of PCD layer relative to width of margin portion [mm] | 0.13 | 0.09 | 0.13 | 0.12 | 0.13 | 0.27 | 2.85 |
| The number of drilled holes | Comparative example 1-1 50 | Example 1-1 105 | Example 1-4 141 | Example 1-7 78 | Comparative example 1-4 48 | Example 1-10 87 | Comparative example 1-7 6 |
| | Comparative example 1-2 47 | Example 1-2 96 | Example 1-5 128 | Example 1-8 82 | Comparative example 1-5 59 | Example 1-11 69 | Comparative example 1-8 14 |
| | Comparative example 1-3 61 | Example 1-3 101 | Example 1-6 153 | Example 1-9 81 | Comparative example 1-6 37 | Example 1-12 72 | Comparative example 1-9 9 |

According to the results of Table 1, first, among Comparative examples 1-1 to 1-9, in Comparative examples 1-7 to 1-9 where a difference between the maximum value and the minimum value of the thickness W3 of the PCD layer 3 exceeded ⅖ times the width W7 (exceeded 0.2 mm), the number of drilled holes was 14 at most and cracks due to stress concentration were generated in the PCD layer 3 so that the drills reached the end of their tool life early. Further, in Comparative examples 1-1 to 1-3 where a difference between the maximum value and the minimum value of the thickness W3 of the PCD layer 3 was equal to or smaller than ⅖ times the width W7 (equal to or smaller than 0.2 mm) and the thickness W3 of the PCD layer 3 was ¼ times the width W7 of the margin portion 7 and Comparative examples 1-4 to 1-6 where a difference between the maximum value and the minimum value of the thickness W3 of the PCD layer 3 was equal to or smaller than ⅖ times the width W7 and the thickness W3 of the PCD layer 3 was 3/2 times the width W7 of the margin portion 7, even in the range where a difference between the maximum value and the minimum value of the thickness W3 was equal to or smaller than ⅖ times the width W7 of the margin portion 7, the number of drilled holes was 61 at most and fracture occurred on the cutting edge 5 formed on the PCD layer 3 so that the drills reached the end of their tool life.

In contrast, in the drills of Examples 1-1 to 1-12 where the thickness W3 of the PCD layer 3 was in the range of ⅓ to 1 times the width W7 of the margin portion 7, sixty nine holes could be formed even in Example 1-11 where the number of drilled holes was smallest. Particularly, in all of Examples 1-1 to 1-6 produced so that a difference between the maximum value and the minimum value of the thickness W3 of the PCD layer 3 was equal to or smaller than ⅖ times the width W7 (equal to or smaller than 0.2 mm) and the thickness W3 of the PCD layer 3 was in the range of ⅓ to ½ times the width W7 of the margin portion 7, about one PCD layer 3 was ½ times the width W7 (0.5 mm) of the margin portion 7. As a result, the number of drilled holes was 82. Even in the drill produced so that the thickness W3 of the same PCD layer 3 was ½ times the width W7 of the margin portion 7, the cutting edge 5 was likely to fracture due to influence of stress concentrated in the PCD layer 3, the tool life thereof was shortened, and thereby the number of drilled holes was small, in comparison with Examples 1-4 to 1-6 where a difference between the maximum value and the minimum value of the thickness W3 was in the range equal to or smaller than ⅖ times the width W7. Similarly, in Examples 1-10 to 1-12 where the thickness W3 of the PCD layer 3 was ½ times the width W7 of the margin portion 7 and a difference between the maximum value and the minimum value of the thickness W3 was larger than ⅖ times the width W7, the number of drilled holes was smaller than that in Examples 1-4 to 1-6 where the thickness W3 of the PCD layer 3 was ½ times the width W7 of the margin portion 7 and a difference between the maximum value and the minimum value of the thickness W3 was in the range equal to or smaller than ⅖ times the width W7. On the other hand, since the thickness W3 of the PCD layer 3 was ½ times the width W7 of the margin portion 7, the number of drilled holes was larger than that in Comparative examples 1-1 to 1-9.

Example 2

Next, in Example 2, double-edge twist drills, each of which includes cutting edges 5 including outer peripheral portions having the shape of a concave curve and formed at ridge portions of rake faces 4 at a tip side of the tool body 1, were produced on the basis of the above-mentioned second embodiment. As in Example 1, three double-edge twist drills were produced to satisfy conditions where the thickness W3 (i.e., the thickness of the PCD layer 3 exposed to the first flank 6A) was ⅓, ½ or 1 times the width W7 (i.e., the width of the margin portion 7) and a difference between the maximum value and the minimum value of the thickness W3 was equal to or smaller than ⅖ times the width W7. These drills were referred to as Examples 2-1 to 2-9 as shown in Table 2. Further, three drills as Examples 2-10 to 2-12 were also produced where the thickness W3 of the PCD layer 3 was ½ times the width W7 of the margin portion 7 and a difference between the maximum value and the minimum value of the thickness W3 of the PCD layer 3 was larger than ⅖ times the width W7. Similarly, as Comparative examples, drills having the same shape of the cutting edge 5 as Examples 2-1 to 2-12 were also produced. Three drills as Comparative examples 2-1 to 2-3 were produced where a difference between the maximum value and the minimum value of the thickness W3 of the PCD layer 3 was equal to or smaller than ⅖ times the width W7 and the thickness W3 of the PCD layer 3 was ¼ times the width W7 of the margin portion 7, three drills as Comparative examples 2-4 to 2-6 were produced where a difference between the maximum value and the minimum value of the thickness W3 of the PCD layer 3 was equal to or smaller than ⅖ times the width W7 and the thickness W3 of the PCD layer 3 was 3/2 times the width W7 of the margin portion 7, and three drills as Comparative examples 2-7 to 2-9 were produced where a difference between the maximum value and the minimum value of the thickness W3 of the PCD layer 3 exceeded ⅖ times the width W7 and the thickness W3 of the PCD layer 3 was 3/2 times the width W7 of the margin portion 7. The thickness W3 of the PCD layer 3 of each of Examples 2-1 to 2-12 and Comparative examples 2-1 to 2-9 was measured by the same method as in Example 1. The results thereof are shown in Table 2.

Then, in Example 2, drilling was performed using these drills to form through-holes in a work material made of only CFRP and having a thickness of 10 mm. The number of drilled holes was measured at the time of fracture occurring on the cutting edge 5 or the wear width of the cutting edge 5 reaching 0.2 mm. The diameter of each of the drills of Examples 2-1 to 2-12 and Comparative examples 2-1 to 2-9 was 10 mm and the width W7 of the margin portion 7 thereof was 0.9 mm. Further, the average diamond grain size of the PCD layer 3 was 3 μm and was smaller than that of Example 1, and the Co content of the PCD layer 3 was 16 vol %. Furthermore, the drilling was performed without a step feed by dry working in which a cutting speed was 350 m/min and a feed speed was 0.1 mm/rev. The results thereof are shown in the following Table 2.

According to the results of Table 2, among Comparative examples 2-1 to 2-9, in Comparative examples 2-7 to 2-9 where a difference between the maximum value and the minimum value of the thickness W3 of the PCD layer 3 exceeded ⅖ times the width W7 (exceeded 0.36 mm), the number of drilled holes did not reach 100 at most and the drills reached the end of their tool life early due to cracks of the PCD layer 3 caused by stress concentration. Further, in Comparative examples 2-1 to 2-3 where a difference between the maximum value and the minimum value of the thickness W3 of the PCD layer 3 was equal to or smaller than ⅖ times the width W7 (equal to or smaller than 0.36 mm) and the thickness W3 of the PCD layer 3 was ¼ times the width W7 of the margin portion 7 and Comparative examples 2-4 to 2-6 where a difference between the maximum value and the minimum value of the thickness W3 of the PCD layer 3 was equal to or smaller than ⅖ times the width W7 and the thickness W3 of the PCD layer 3 was 3/2 times the width W7 of the margin portion 7, the number of drilled holes was 402 at most, and the drills reached the end of their tool life due to the fracture of the cutting edge 5.

In contrast, in the drills of Examples 2-1 to 2-9 where the thickness W3 of the PCD layer 3 was in the range of ⅓ to 1 times the width W7 of the margin portion 7 and a difference between the maximum value and the minimum value was equal to or smaller than ⅖ times the width W7 (equal to or smaller than 0.36 mm), at least 472 holes could be formed and holes close to 500 could be drilled. Further, as in Examples 1-1 to 1-6, in Examples 2-1 to 2-6 where a difference between the maximum value and the minimum value of the thickness W3 of the PCD layer 3 was equal to or smaller than ⅖ times the width W7 (equal to or smaller than 0.36 mm) and the thickness W3 of the PCD layer 3 was in the range of ⅓ to ½ times the width W7 of the margin portion 7, the number of drilled holes was larger than that in Examples 2-7 to 2-9 where a difference between the maximum value and the minimum value of the thickness W3 of the PCD layer 3 was equal to or smaller than ⅖ times the width W7 and the thickness W3 of the PCD layer 3 was equal to the width W7 of the margin portion 7. Particularly, in all of Examples 2-4 to 2-6 where a difference between the maximum value and the minimum value of the thickness W3 of the PCD layer 3 was equal to or smaller than ⅖ times the width W7 and the thickness W3 of the PCD layer 3 was ½ times the width W7 of the margin portion 7, the number of drilled holes exceeded 600 and the tool life of each tool was further increased. Furthermore, in Examples 2-10 to 2-12 where the thickness W3 of the PCD layer 3 was ½ times the

TABLE 2

| Thickness of PCD layer relative to width of margin portion | ¼ times | ⅓ times | ½ times | 1 time | 3/2 times | ½ times | ½ times |
|---|---|---|---|---|---|---|---|
| Difference between maximum value and minimum value of thickness of PCD layer relative to width of margin portion [mm] | 0.13 | 0.09 | 0.13 | 0.12 | 0.13 | 0.95 | 2.85 |
| The number of drilled holes | Comparative example 2-1 336 | Example 2-1 525 | Example 2-4 611 | Example 2-7 486 | Comparative example 2-4 292 | Example 2-10 342 | Comparative example 2-7 42 |
| | Comparative example 2-2 402 | Example 2-2 521 | Example 2-5 670 | Example 2-8 475 | Comparative example 2-5 369 | Example 2-11 304 | Comparative example 2-8 23 |
| | Comparative example 2-3 279 | Example 2-3 498 | Example 2-6 623 | Example 2-9 472 | Comparative example 2-6 340 | Example 2-12 421 | Comparative example 2-9 84 | width W7 of the margin portion 7 and a difference between the maximum value and the minimum value of the thickness W3 was larger than ⅖ times the width W7 (larger than 0.36 mm), the number of drilled holes was smaller than that in Examples 2-4 to 2-6 where the thickness W3 of the PCD layer 3 was ½ times the width W7 of the margin portion 7 and a difference between the maximum value and the minimum value of the thickness W3 was equal to or smaller than ⅖ times the width W7. However, since the thickness W3 of the PCD layer 3 was ½ times the width W7 of the margin portion 7, the average number of drilled holes was larger than that in Comparative examples 2-1 to 2-9.

Example 3

In addition, in Example 3, three end mills, in each of which the present invention was applied to the above-mentioned end mill, were produced to satisfy conditions where the thickness W13 (i.e., the thickness of the PCD layer 13 exposed to the margin portion (the first outer peripheral flank face) in the circumferential direction) was ⅓, ½ or 1 times the width W17 (i.e., the width of the margin portion 17 in the circumferential direction) and a difference between the maximum value and the minimum value of the thickness W13 was equal to or smaller than ⅖ times the width W17. These end mills were referred to as Examples 3-1 to 3-9 as shown in Table 3. Further, three end mills as Examples 3-10 to 3-12 were also produced where the thickness W13 of the PCD layer 13 was ½ times the width W17 of the margin portion 17 and a difference between the maximum value and the minimum value of the thickness W13 of the PCD layer 13 was larger than ⅖ times the width W17. As Comparative examples to compare with these examples, three end mills as Comparative examples 3-1 to 3-3 were produced where a difference between the maximum value and the minimum value of the thickness W13 was equal to or smaller than ⅖ of the width W17 and the thickness W13 was ¼ times the width W17, three end mills as Comparative examples 3-4 to 3-6 were produced where a difference between the maximum value and the minimum value of the thickness W13 was equal to or smaller than ⅖ of the width W17 and the thickness W13 was 3/2 times the width W17, and three end mills as Comparative examples 3-7 to 3-9 were produced where a difference between the maximum value and the minimum value of the thickness W13 exceeded ⅖ of the width W17 and the thickness W13 was 3/2 times the width W17, in which the thickness W13 was the thickness of the PCD layer 13 exposed to the margin portion (the first outer peripheral flank face) in the circumferential direction and the width W17 was the width of the margin portion 17 in the circumferential direction. The thicknesses of the PCD layer 13 in the direction orthogonal to the ridge of the cutting edge were measured by observing the PCD layer W13 from the tip side in the axis direction by a stereoscopic microscope, at each of six points, which equally divided a line of the PCD layer 13 along the ridge of the cutting edge from the inner peripheral end close to the axis O to the outer peripheral end into five pieces, in Examples 3-1 to 3-12 and Comparative examples 3-1 to 3-9. Then, the average value of the thicknesses of the PCD layer 13 at 24 points, which were measured in PCD layers 13 formed in four different cutting edges 15, was regarded as the thickness W13 of the PCD layer 13. Further, points in which thicknesses of the PCD layer 13 were the thinnest and the thickest were identified, respectively, by observing the entire PCD layer 13 by a stereoscopic microscope; and they were regarded as the minimum value and the maximum value of the thicknesses of the PCD layer, respectively. The results thereof are shown in Table 3.

Then, trimming was performed using these end mills to cut an unwanted portion of an opening edge of a window frame-shaped work material made of only CFRP and having a thickness of 20 mm. A cutting length was measured at the time of fracture occurring on the cutting edge (peripheral cutting edge) or the wear width of the cutting edge (peripheral cutting edge) reaching 0.2 mm. Each of these end mills was a four-edge square end mill of which the diameter was 10 mm and the width of the margin portion 7 was 0.7 mm. The average diamond grain size of the PCD layer was 3 μm and was small as in Example 2, and the Co content of the PCD layer was 16 vol %. Further, a working condition was dry working in which a cutting speed was 200 m/min, a feed speed was 700 mm/min, and the depth of a cut was 5 mm. The results thereof are shown in the following Table 3.

TABLE 3

| Thickness of PCD layer relative to width of margin portion | ¼ times | ⅓ times | ½ times | 1 time | 3/2 times | ½ times | 3/2 times |
|---|---|---|---|---|---|---|---|
| Difference between maximum value and minimum value of thickness of PCD layer relative to width of margin portion [mm] | 0.13 | 0.09 | 0.13 | 0.12 | 0.13 | 0.75 | 2.85 |
| Cutting length | Comparative example 3-1 12 m | Example 3-1 20 m | Example 3-4 25 m | Example 3-7 18 m | Comparative example 3-4 13 m | Example 3-10 16 m | Comparative example 3-7 6 m |
| | Comparative example 3-2 13 m | Example 3-2 21 m | Example 3-5 24 m | Example 3-8 19 m | Comparative example 3-5 12 m | Example 3-11 24 m | Comparative example 3-8 10 m |
| | Comparative example 3-3 12 m | Example 3-3 19 m | Example 3-6 24 m | Example 3-9 18 m | Comparative example 3-6 13 m | Example 3-12 13 m | Comparative example 3-9 11 m |

According to the results of Table 3, among Comparative examples 3-1 to 3-9, in Comparative examples 3-7 to 3-9 where a difference between the maximum value and the minimum value of the thickness W13 of the PCD layer 13 exceeded ⅖ of the width W17 of the margin portion 17 (exceeded 0.28 mm), cracks caused by stress concentration were generated in the PCD layer 13, so that the end mills reached the end of their tool life at a cutting length of 11 m at most. Further, even in Comparative examples 3-1 to 3-3 where a difference between the maximum value and the minimum value of the thickness W13 of the PCD layer 13 was equal to or smaller than ⅖ times the width W17 (equal to or smaller than 0.28 mm) and the thickness W13 of the PCD layer 13 was ¼ times the width W17 of the margin portion 17 and Comparative examples 3-4 to 3-6 where a difference between the maximum value and the minimum value of the thickness W13 of the PCD layer 13 was equal to or smaller than ⅖ times the width W17 (equal to or smaller than 0.28 mm) and the thickness W13 of the PCD layer 13 was 3/2 times the width W17 of the margin portion 17, the end mills reached the end of their tool life due to the fracture of the peripheral cutting edge formed on the PCD layer when a cutting length was about 13 m.

In contrast, among the end mills of Examples 3-1 to 3-9 where a difference between the maximum value and the minimum value of the thickness W13 of the PCD layer 13 was equal to or smaller than ⅖ times the width W17 (equal to or smaller than 0.28 mm) and the thickness W13 of the PCD layer 13 was in the range of ⅓ to 1 times the width W17 of the margin portion 17, a cutting length was 18 m even in Examples 3-7 and 3-9 having the shortest cutting length. Among Examples 3-1 to 3-3 where the thickness W13 of the PCD layer 13 was ⅓ times the width W17 of the margin portion 17, a cutting length was 19 m even in Example 3-3 having the shortest cutting length. Particularly, a cutting length exceeding 20 m could be obtained in all of Examples 3-4 to 3-6 where the thickness W13 of the PCD layer 13 was ½ times the width W17 of the margin portion 17. Further, in Examples 3-10 to 3-12 where the thickness W13 of the PCD layer 13 was ½ times the width W17 of the margin portion 17 and a difference between the maximum value and the minimum value of the thickness W13 was larger than ⅖ times the width W17 (larger than 0.28 mm), a cutting length was shorter than that in Examples 3-4 to 3-6 where the thickness W13 of the PCD layer 13 was ½ times the width W17 of the margin portion 17 and a difference between the maximum value and the minimum value of the thickness W13 was equal to or smaller than ⅖ times the width W17. However, since the thickness W13 of the PCD layer 13 was ½ times the width W17 of the margin portion 17, the average cutting length was longer than that in comparative examples 3-1 to 3-9.

According to the results of Examples 1 to 3, it was found that fracturing resistance was excellent in the tools in which the thickness of the PCD layer was ⅓ to 1 times, particularly, ⅓ to ½ times the width of the margin portion. In addition, it was found that fracturing resistance was further excellent when a difference between the maximum value and the minimum value of the thickness of the PCD layer was equal to or smaller than ⅖ times the width of the margin portion.

Furthermore, according to the results of Examples 1, 2, and 3, it was desirable that the diamond grain size of the PCD layer be large in a case where a work material was a composite material of difficult-to-cut materials, such as CFRP-Ti or CFRP-Al, and the diamond grain size of the PCD layer be small in a case where a work material was fiber-reinforced plastic, such as CFRP or GFRP.

INDUSTRIAL APPLICABILITY

In the rotary cutting tool including a polycrystalline diamond material of the present invention, sufficient fracturing resistance of the PCD layer on which the cutting edge is formed can be ensured while suppressing wear from reaching the carbide substrate made of cemented carbide early. Accordingly, the rotary cutting tool including a polycrystalline diamond material of the present invention is suitable to cut CFRP or a composite material thereof.

REFERENCE SIGNS LIST

1: TOOL BODY
2: FLUTE
3: PCD LAYER (POLYCRYSTALLINE DIAMOND LAYER)
4: RAKE FACE
5: CUTTING EDGE
5A: THINNING EDGE
6: FLANK
6A: FIRST FLANK
6B: SECOND FLANK
7: MARGIN PORTION
O: AXIS OF TOOL BODY 1
T: ROTATION DIRECTION
W3: THICKNESS OF PCD LAYER 3
W7: WIDTH OF MARGIN PORTION 7

The invention claimed is:

1. A rotary cutting tool including a polycrystalline diamond material, the rotary cutting tool comprising:
a tool body configured to be rotated about an axis with a carbide substrate made of cemented carbide and a flute provided at a tip portion of the tool body;
a polycrystalline diamond layer made of a polycrystalline diamond material sintered integrally with the carbide substrate and provided on an inside face of the flute which faces in a rotation direction of the tool body;
a cutting edge provided on the polycrystalline diamond layer to have a rake face as the inside face; and
a thinning edge formed in a shape of a convex curve so as to connect to a linearly extending portion of the cutting edge, said thinning edge extending toward the axis,
wherein a margin portion continuous with a rear side of the flute in the rotation direction is formed on an outer periphery of the tip portion of the tool body,
the cutting edge is formed at a ridge portion of the rake face at a tip side of the tool body, and
a thickness of the polycrystalline diamond layer is set in a range of ⅓ to 1 times a width of the margin portion when seen from the tip side of the tool body in a direction of the axis.

2. The rotary cutting tool including a polycrystalline diamond material according to claim 1,
wherein a difference between the maximum value and the minimum value of the thickness of the polycrystalline diamond layer is set in a range equal to or smaller than ⅖ times the width of the margin portion.

3. The rotary cutting tool including a polycrystalline diamond material according to claim 1,
wherein the polycrystalline diamond layer contains 75 to 95 vol % of diamond.

4. The rotary cutting tool including a polycrystalline diamond material according to claim 1,
wherein a diamond grain size of the polycrystalline diamond layer is in a range of 0.5 to 60 μm.

5. The rotary cutting tool including a polycrystalline diamond material according to claim 1,
wherein a Knoop hardness of the polycrystalline diamond layer is in a range of 35 to 44 GPa.

6. A rotary cutting tool including a polycrystalline diamond material, the rotary cutting tool comprising:
a tool body configured to be rotated about an axis with a carbide substrate made of cemented carbide and a flute provided at a tip portion of the tool body;

a polycrystalline diamond layer made of a polycrystalline diamond material sintered integrally with the carbide substrate and provided on an inside face of the flute which faces in a rotation direction of the tool body; and a cutting edge provided on the polycrystalline diamond layer to have a rake face as the inside face, wherein a margin portion continuous with a rear side of the flute in the rotation direction is formed on an outer periphery of the tip portion of the tool body, the cutting edge is formed at a ridge portion of the rake face at a tip side of the tool body, a thickness of the polycrystalline diamond layer is set in a range of ⅓ to 1 times a width of the margin portion when seen from the tip side of the tool body in a direction of the axis, and the cutting edge is formed in a shape of a concave and convex curve.

7. The rotary cutting tool including a polycrystalline diamond material according to claim 6, wherein a difference between the maximum value and the minimum value of the thickness of the polycrystalline diamond layer is set in a range equal to or smaller than ⅖ times the width of the margin portion.

8. The rotary cutting tool including a polycrystalline diamond material according to claim 6, wherein the polycrystalline diamond layer contains 75 to 95 vol % of diamond.

9. The rotary cutting tool including a polycrystalline diamond material according claim 6, wherein a diamond grain size of the polycrystalline diamond layer is in a range of 0.5 to 60 μm.

10. The rotary cutting tool including a polycrystalline diamond material according to claim 6, wherein a Knoop hardness of the polycrystalline diamond layer is in a range of 35 to 44 GPa.

* * * * *